(12) United States Patent
Chang

(10) Patent No.: US 7,679,011 B2
(45) Date of Patent: Mar. 16, 2010

(54) INPUT DEVICE FOR ELECTRONIC DEVICE

(75) Inventor: Jen-Tsorng Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 950 days.

(21) Appl. No.: 11/450,635

(22) Filed: Jun. 9, 2006

(65) Prior Publication Data

US 2006/0279535 A1 Dec. 14, 2006

(30) Foreign Application Priority Data

Jun. 10, 2005 (TW) ............................. 94119195 A
Jun. 16, 2005 (CN) ....................... 2005 1 0035379

(51) Int. Cl.
*H01H 25/04* (2006.01)
(52) U.S. Cl. ...................... 200/6 A; 200/5 R
(58) Field of Classification Search .................. 200/4, 200/5 R, 6 A, 17 R, 296, 331, 18; 341/20, 341/21; 345/156, 157, 160, 161, 168; 463/37, 463/47; 273/241; 248/694, 918
See application file for complete search history.

(56) References Cited

U.S. PATENT DOCUMENTS

| 3,950,634 | A | * | 4/1976 | Speiser ................... 235/145 R |
| 4,575,591 | A | * | 3/1986 | Lugaresi .................... 200/6 A |
| 4,786,768 | A | * | 11/1988 | Langewis et al. ........... 200/6 A |
| 4,825,019 | A | * | 4/1989 | Fisher ........................ 200/6 A |
| 4,945,357 | A | * | 7/1990 | Tal .............................. 341/20 |
| 5,034,574 | A | * | 7/1991 | Martovitz ................... 200/6 A |
| 5,343,219 | A | * | 8/1994 | DuBosque, Jr. ............ 345/160 |
| 5,349,881 | A | * | 9/1994 | Olorenshaw et al. ... 74/471 XY |
| 5,640,179 | A | * | 6/1997 | Lake ......................... 345/161 |
| 6,209,845 | B1 | * | 4/2001 | Klitsner et al. ............ 248/694 |
| 6,322,449 | B1 | * | 11/2001 | Klitsner et al. ............... 463/37 |
| 6,844,511 | B1 | * | 1/2005 | Hsu et al. ................... 200/6 A |
| 7,449,650 | B2 | * | 11/2008 | Richardson et al. ........ 200/331 |

FOREIGN PATENT DOCUMENTS

| CN | 2504842 Y | 8/2002 |
| CN | 01232215.6 | 9/2002 |
| CN | 2618271 Y | 5/2004 |

\* cited by examiner

*Primary Examiner*—Michael A Friedhofer
(74) *Attorney, Agent, or Firm*—Steven M. Reiss

(57) ABSTRACT

An input device (100) includes a housing (80), a base (40), a shaft (20), a first elastic member (60), and at least one second elastic member (70). The housing has a cavity (800), a first end and an opposite second open end. The first end has a hole (802) communicated with the cavity. The base is pivotably received in the cavity of the housing with part of the base protruding out of the cavity from the hole. The base defines a through hole (406) and includes at least one protrusion (408). The shaft is slidably received in the through hole of the base. The first elastic member provides a force to reset the shaft. The second elastic member connected to the base and the housing for providing a force to reset the base. The present invention also provides an electronic device employing the input device.

18 Claims, 6 Drawing Sheets

INPUT DEVICE FOR ELECTRONIC DEVICE

BACKGROUND OF THE INVENTION

1. Field of the Invention

The present invention generally relates to input devices and, more particularly, to an input device for use in an electronic device such as a mobile phone or a PDA (personal digital assistant).

2. Discussion of the Related Art

With the rapid development of communication technology, mobile phones have become a commonplace tool for communication in people's lives. In addition, because of the use of memory cards and memory sticks to boost memory, and because of the increasing convenience with which mobile phones can connect to the internet, mobile phones are increasingly being used as portable game devices. Mobile phone games have become a popular way of passing the time, especially when waiting for a meeting or stuck in traffic. Most games require the player to operate the keys of controls quickly and with precision. However, with only very small sized keys and small distances between the keys, mobile phones are not very suitable as game playing devices. The inconvenience of operating the keys reduces the fun of playing games. Therefore, an input device which can be operated quickly and can be conveniently used with the mobile phone is needed.

Referring to FIG. 1, a typical input device includes a front panel 112 and a control board 114. Two side boards 113 are vertically formed on two ends of the front panel 112. A hole (not labeled) is defined in the center of the front panel 112. Four projections 115 are formed on the control board 114 respectively adjacent to the four edges of the control board 114, and a joystick 116 is formed on the control board 114 opposite to the projections 115. The joystick 116 runs through the hole of the front panel 112. Catching mechanisms 117 are formed on the side boards 113 for locking the input device onto a mobile phone or other electronic device.

Without any resetting mechanism, the above-described input device cannot reset automatically (i.e. return to a central position) after being pressed. Therefore, the input device does not satisfactorily meet the demands of consumers for an easy-to-use input mechanism.

What is needed, therefore, is an input device which can easily be operated and is able to reset automatically.

SUMMARY OF THE INVENTION

An input device includes a housing, a base, a shaft, a first elastic member and at least one second elastic member. The housing has a cavity therein, and has a first end and an opposite second open end. The first end has a hole communicated with the cavity. The base is pivotably received in the cavity of the housing with part of the base protruding out of the cavity from the hole of the housing. The base defines a through hole and includes at least one protrusion on a base surface which faces the second open end of the cavity. The shaft is slidably received in the through hole of the base. The first elastic member provides a force to reset the shaft when the shaft is away from an original position. The second elastic member is connected to the base and the housing, and provides a force to reset the base when the base is away from an original position.

Other advantages and novel features of preferred embodiments of the present input device will become more apparent from the following detailed description when taken in conjunction with the accompanying drawings.

BRIEF DESCRIPTION OF THE DRAWINGS

Many aspects of the input device can be better understood with reference to the following drawings. The components in the drawings are not necessarily drawn to scale, the emphasis instead being placed upon clearly illustrating the principles of the input device. Moreover, in the drawings, like reference numerals designate corresponding parts throughout the several views.

DETAILED DESCRIPTION OF PREFERRED EMBODIMENTS

An input device can be employed in electronic device such as mobile phones and PDAs. The input device used in a mobile phone is shown and detailed for the purposes of providing a simple description of the preferred embodiment. The present input device and embodiments thereof are not to be construed as being limited to the following description.

Figure 1:
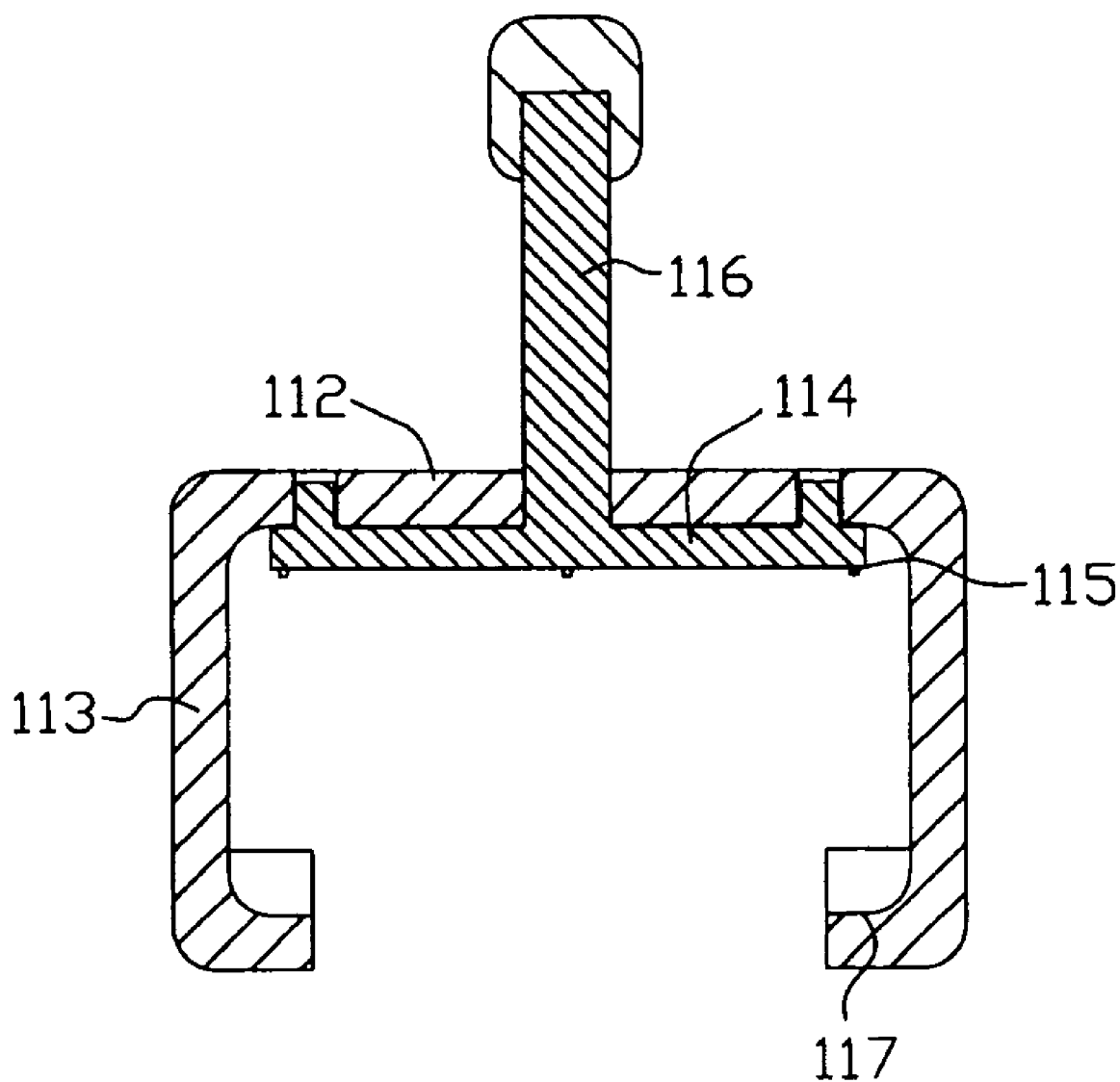
FIG. 1 is a cross-sectional view of a conventional input device.
Figure 2:
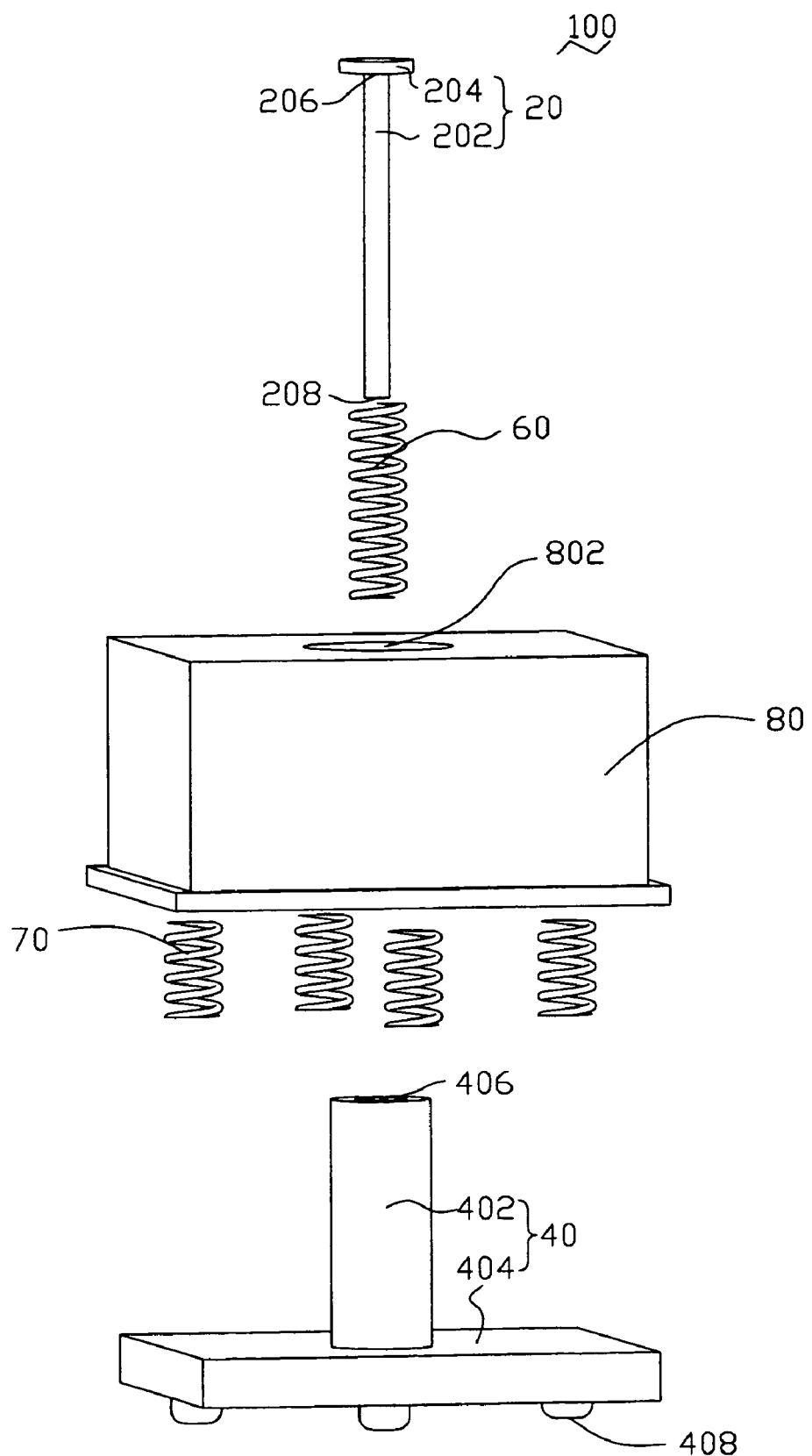
FIG. 2 is an exploded, isometric view of an input device in accordance with a first preferred embodiment.
Figure 3:
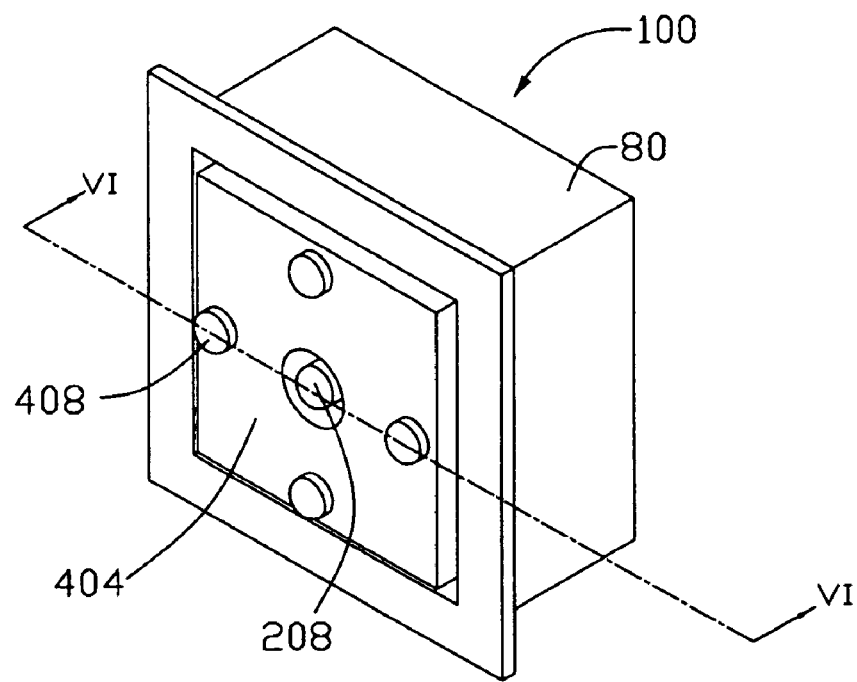
FIG. 3 is a cross-sectional, assembled view of the input device of FIG. 2.
Figure 3:
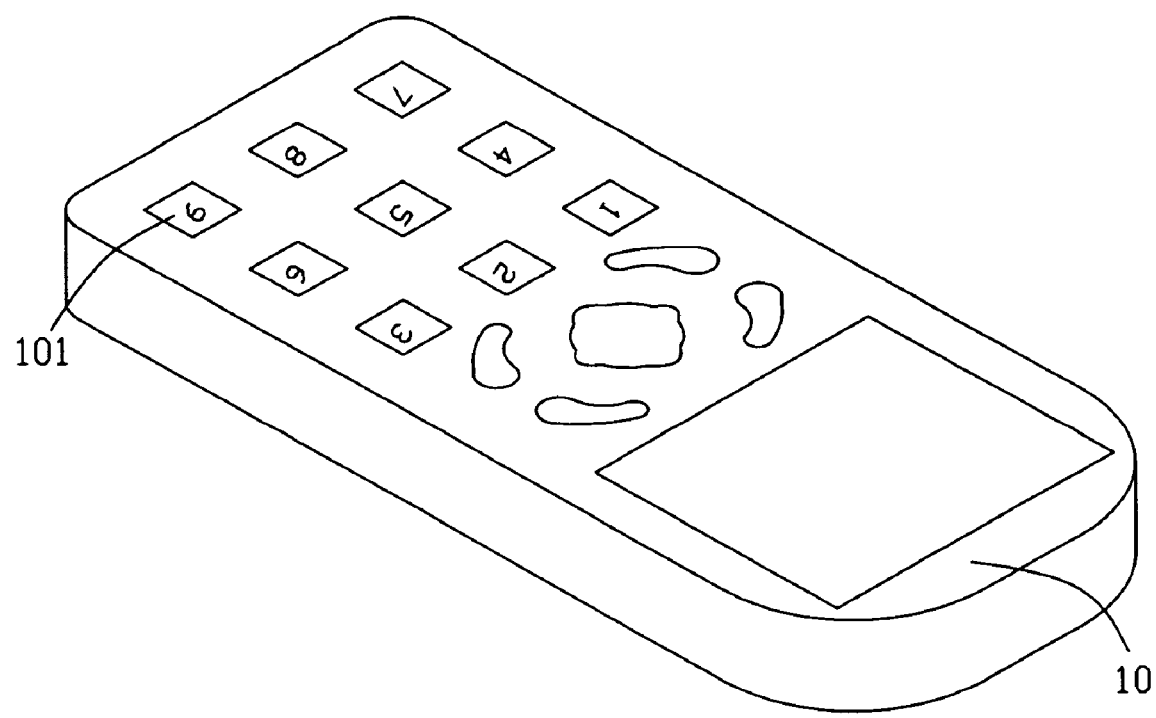
Figure 4:
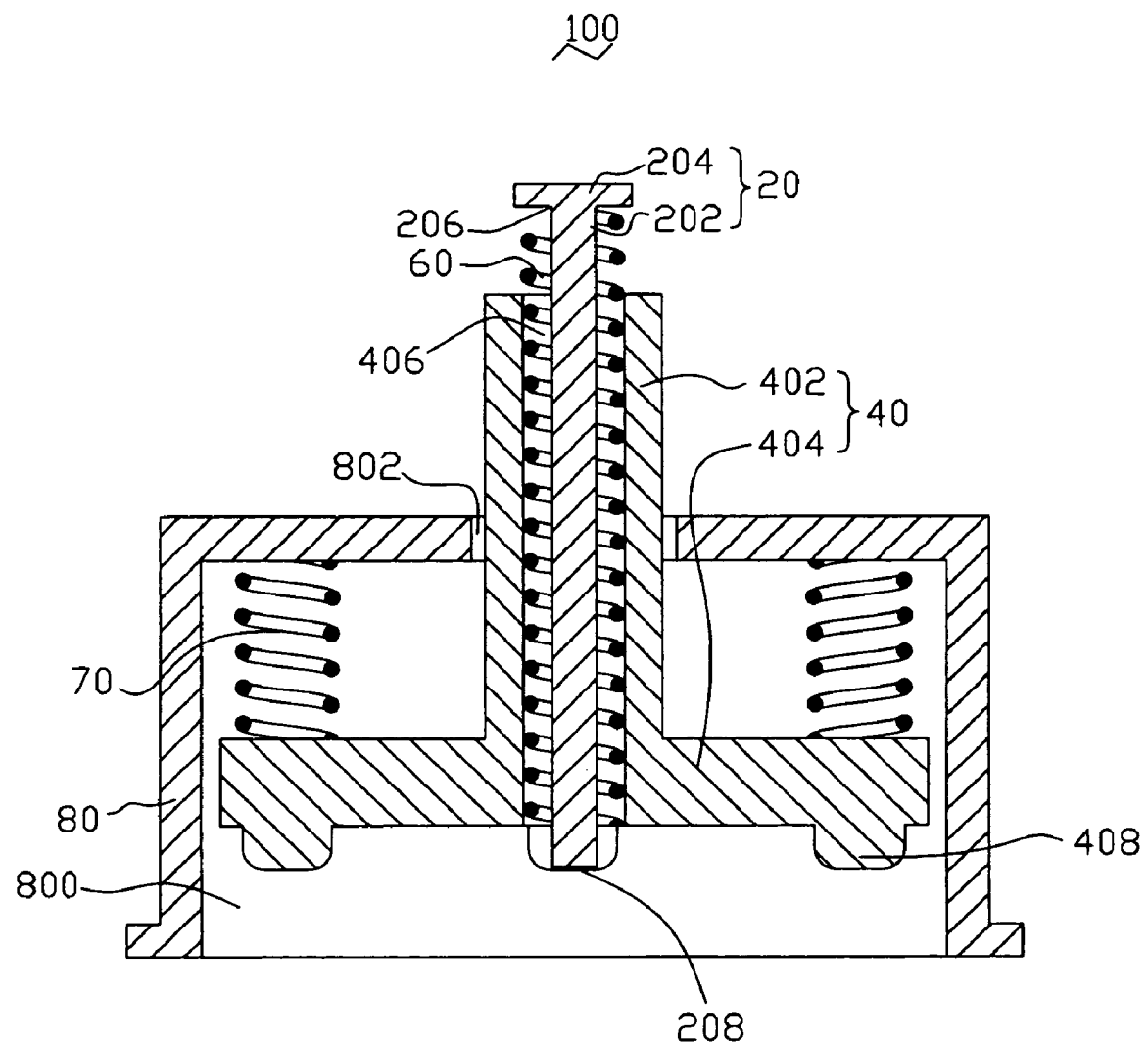
FIG. 4 is an unassembled, isometric view of the input device of FIG. 2 employed in a mobile phone.

Referring to FIGS. 2-4, covering on a keyboard 101, an input device 100 is employed in a mobile phone having a main body 10. The input device 100 includes a shaft 20, a base 40, a first spring 60, four second springs 70, and a housing 80.

The shaft 20 includes a shaft portion 202 and a flange 204. The shaft portion 202 includes a first end 206 and an opposite second end 208. The flange 204 is located at the first end 206 of the shaft portion 202. The second end 208 of the shaft portion 202 is used to press a key of the keyboard 101.

The base 40 includes a cylinder-shaped pole 402 and a substantially cuboid base body 404. The pole 402 is formed on the center of the base body 404. Running through the pole 402 and the base body 404, a through hole 406 is defined in the base 40 for receiving the shaft 20 and the first spring 60. Four protrusions 408 are formed on the bottom side opposite to the pole 402 of the base body 404. The protrusions 408 which are used to press four keys of the keyboard 101 are respectively arranged adjacent to four edges of the base body 404.

The first spring 60 is helical in configuration and occupies a cylinder-shaped volume. With one end resisting or fixed to the flange 204 of the shaft 20 and an opposite end fixed to the bottom of the base body 404, the first spring 60 is mounted in the through hole 406 of the base 40 and surrounds the shaft portion 202. The ends of the first spring 60 are fixed to the shaft 20 and the base 40 by pasting with adhesive, welding, or any suitable means. In an alternative embodiment, two hooks are mounted the ends of the first spring 60, the shaft 20 and the base 40, the hooks of the ends engage with the shaft 20 and the base 40 to mount the first spring 60.

The second springs 70 are helical in configuration and occupy a cylinder-shaped volume. One end of each second spring 70 is connected to the base body 404 of the base 40 and an opposite end is connected to the housing 80 in the same manner as the connection of the first spring 60 between the base 40 and the shaft 20. Each of the four second springs 70 are separately positioned adjacent to their respective four edges of the base body 404 in positions corresponding to the protrusions 408. The second springs 70 are aligned in parallel to the first spring 60.

The housing 80, having a cavity 800, is substantially hollow cuboid in shape. The housing 80 has a housing open end and an opposite housing end with a hole 802. The base 40 is partly received in the cavity 800 of the housing 80 with a part of the pole 402 protruding out of the cavity 800 from the hole 802. The hole 802 is larger than the pole 402 of the base 40 in diameter, thus allowing the pole 402 to "rock" or "pivot" (i.e. change its angle relative to the keypad from the perpendicular, thus bringing the protrusions 115 into contact with the keys) in the hole 802. The housing 80 is either partly or wholly magnetic and can therefore be magnetically attached to a magnetized section of the main body 10 of the mobile phone.

In assembly, the first spring 60 surrounds the shaft portion 202 of the shaft 20 with one end connected to the first end 206 of the shaft portion 202. With the opposite end connected to the bottom of the base 40, the first spring 60 together with the shaft 20 is slidably inserted in the through hole 406 of the base 40 and is thus able to pivot/rock. One end of each second spring 70 is mounted in the cavity 800 of the housing 80 and is connected to the housing end with the hole 802. The assembled shaft 20, base 40, and first spring 60 are mounted in the cavity 800 of the housing 80 from the open end. Finally, with the base 40 being slanted at an angle, another end of each second spring 70 is connected to the base body 404 opposite to the protrusions 408. The base 40 can be rocked in the cavity 800 of the housing 80. The protrusion 408 of the base 40 and the second end 208 of the shaft 20 is able to protrude out from the housing 80 via the open end.

Figure 5:
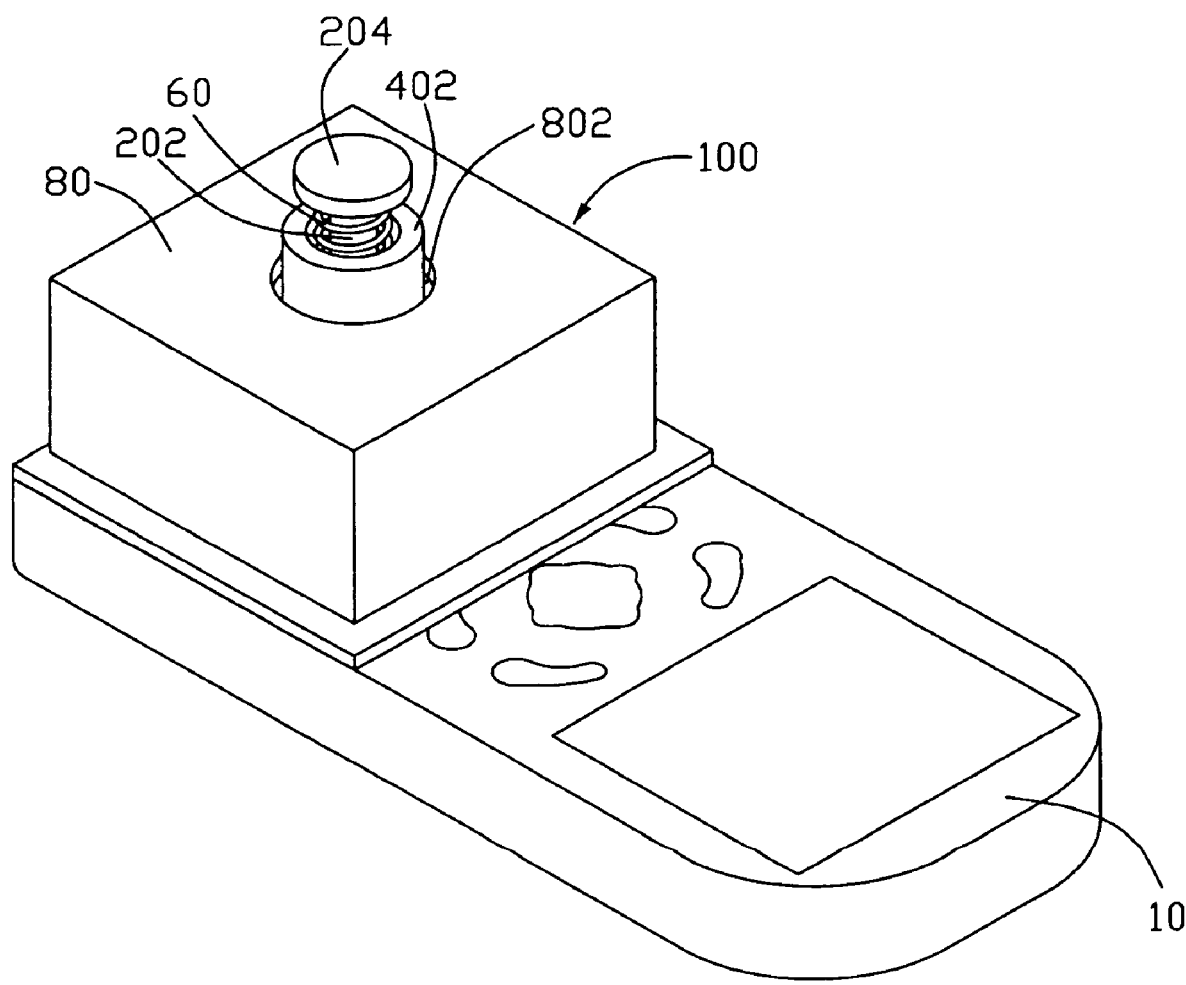
FIG. 5 is similar to FIG. 4, but showing an assembled, isometric view.

Particularly referring to FIGS. 4 and 5, generally, the keys "2", "4", "5", "6", and "8" of the mobile phones respectively correspond to the "upwards", "turn left", "shoot", "downwards", and "turn right" commands when playing games. In use, the input device 100 is mounted onto the main body 10 of the mobile phone by attractive magnetic force produced between the housing 80 and the main body 10, and at least partly covers the keyboard 101. The protrusions 408 of the base 40 correspond to the keys "2", "4", "6", "8", whilst the second end 208 of the shaft portion 202 of the shaft 20 corresponds to "5". When the shaft 20 is pressed, the second end 208 of the shaft portion 202 presses the key "5" to carry out the "shoot" command. Meanwhile, the first spring 60 is compressed. When the shaft 20 is released, the shaft 20 returns to its original position due to the biasing action of the first spring 60. When the shaft 20 is rocked upwards, downwards, leftwards and rightwards, the protrusions 408 of the base 40 press the keys "2", "8", "4" and "6", respectively due to the slating of the base, thus carrying out the corresponding "upwards", "downwards", "turn left" and "turn right" commands. Meanwhile, the second spring 70 corresponding to one of the pressed protrusions 408 is extended and the second spring 70 opposite to the pressed protrusion 408 is compressed. When the pressure on the shaft 20 is released, the shaft 20 and base 40 reset due to the biasing action of the second springs 70. Thereby, a person can input commands into the mobile phone quickly with the help of the input device 100.

Figure 6:
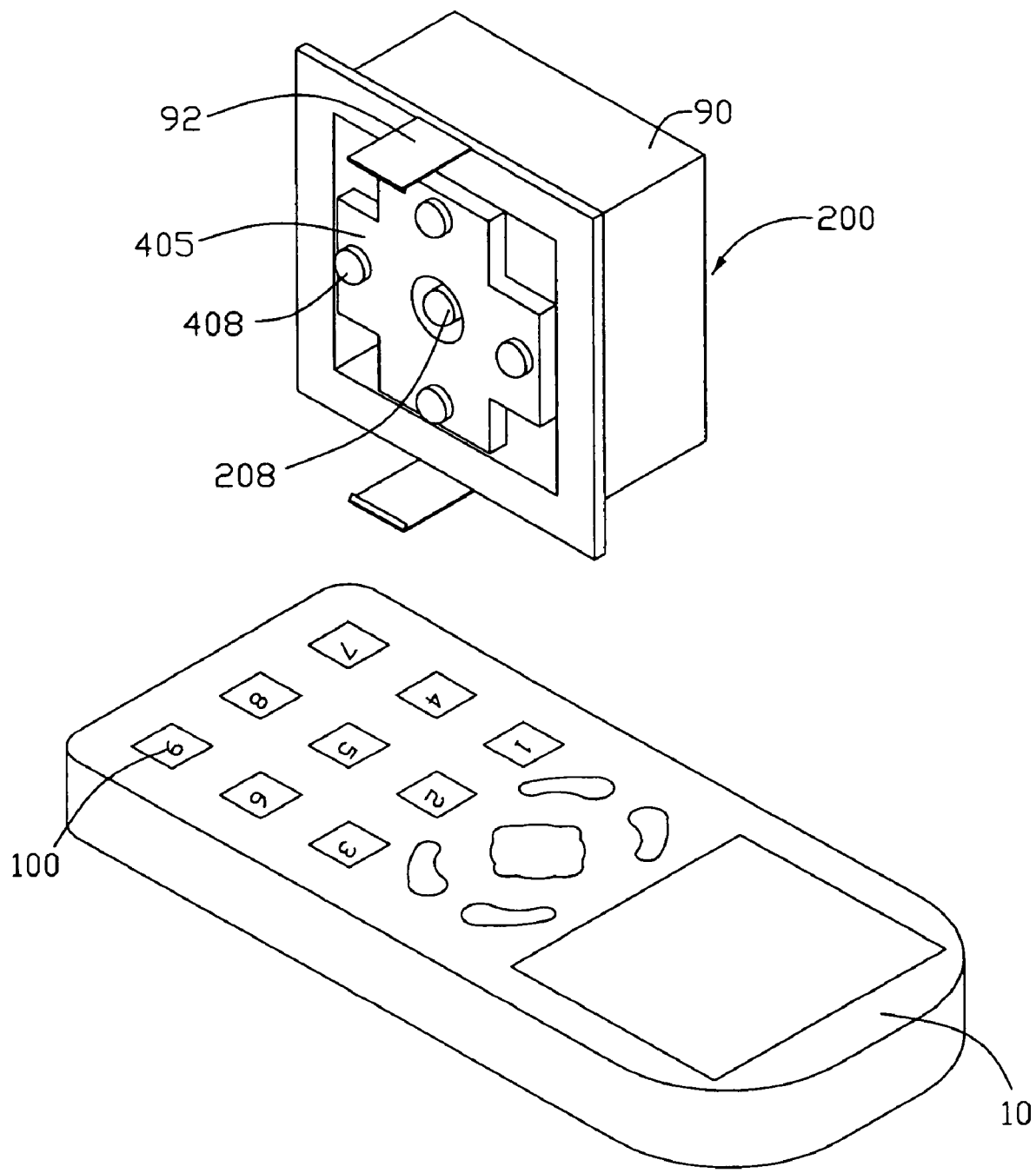
FIG. 6 is an unassembled, isometric view of the input device in accordance with a second embodiment employed in a mobile phone.

Referring to FIG. 6, in a second embodiment, an input device 200 is provided. Other elements are the same as the input device 100 except the housing 80 and the base 40. The input device 200 has a housing 90 which is not magnetic and a locking portion 92 for fixing the case 90 onto the main body 10 of the mobile phone is formed on the bottom of the case 90. The case 90 can also be fixed to the main body 10 by a strap or by an elastic strap. Correspondingly, the main body 10 does not need to be magnetic either. The base 40 includes a pole 402 and a cross-shaped basic board 405. The protrusions 408 are arranged at the four branches of the basic board 405, as such it is much easier to assemble the second springs 70.

In an alternative embodiment, the first and second springs 60, 70 can be other elastic members such as rubber columns. The first spring 60 can be arranged at the side of the shaft portion 202 of the shaft 20 but does not surround the shaft portion 202. A number of the second springs 70 can be other rather than four. For example, two second springs 70 are respectively provided in any of two adjacent vertical directions. If playing a game needs to use less than five keys, protrusions 408 on the base 40 can be less than four. If playing a game needs to use more than five keys, the base body 404 and the basic board 405 can be polygonal, for example pentagon or hexagon, and protrusions 408 on the base 40 can be more than four, for example five or six.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An input device comprising:
    a housing having a cavity therein, the housing having a first end and an opposite second open end, the first end having a hole defined therein, the hole being in communication with the cavity;
    a base pivotably received in the cavity of the housing with part of the base protruding out of the cavity from the hole of the housing, the base defining a through hole and including at least one protrusion on a base surface which faces the second open end of the cavity;
    a shaft slidably received in the through hole of the base;
    a first elastic member for providing a force to reset the shaft when the shaft being away from an original position; and
    at least one second elastic member connected to the base and the housing for providing a force to reset the base when the base being away from an original position.

2. The input device as claimed in claim 1, wherein the shaft comprises a shaft portion having a first end and a second end, and a flange formed at the first end of the shaft portion.

3. The input device as claimed in claim 2, wherein the first elastic member is a helical, cylinder-shaped first spring, one end of the first spring is connected to the first end of the shaft portion, and an opposite end of the first spring is connected to the base.

4. The input device as claimed in claim 1, wherein the base comprises a pole and a base body, four protrusions are formed on the bottom of the base body, the protrusions are formed on the bottom sides opposite to the pole of the base body.

5. The input device as claimed in claim 4, wherein two second elastic members are provided, the second elastic members are helical, cylinder-shaped second springs, the second springs are respectively arranged in any of two adjacent vertical directions, one end of each second spring is connected to the base and an opposite end of each second spring is connected to the housing.

6. The input device as claimed in claim 5, wherein the base body is substantially cuboid in shape, the four protrusions are respectively arranged adjacent to four edges of the base body.

7. The input device as claimed in claim 5, wherein the base body is cross-shaped, the four protrusions are respectively arranged at the four branches of the base body.

8. An electronic device comprising:
- a main body with a key board having a plurality of keys; and
- an input device mounted on the main body, the input device covering at least some of the keys, the input device comprising:
  - a housing having a cavity therein, the housing having a first end and an opposite second open end, the first end having a hole defined therein, the hole being in communication with the cavity;
  - a base pivotably received in the cavity of the housing with part of the base protruding out of the cavity from the hole of the housing, the base defining a through hole and including at least one protrusion on a base surface which faces the second open end of the cavity;
  - a shaft slidably received in the through hole of the base;
  - a first elastic member for providing a force to reset the shaft when the shaft being away from an original position; and
  - at least one second elastic member connected to the base and the housing for providing a force to reset the base when the base being away from an original position.

9. The electronic device as claimed in claim 8, wherein the shaft comprises a shaft portion having a first end and a second end, and a flange formed at the first end of the shaft portion.

10. The electronic device as claimed in claim 9, wherein the first elastic member is a helical, cylinder-shaped first spring, one end of the first spring is connected to the first end of the shaft portion, and an opposite end of the first spring is connected to the base.

11. The electronic device as claimed in claim 9, wherein the base comprises a pole and a base body, four protrusions are formed on the bottom of the base body, the protrusions are formed on the bottom sides opposite to the pole of the base body, the protrusions and the second end of the shaft portion respectively correspond to five keys of the keypad of the main body.

12. The electronic device as claimed in claim 11, wherein two second elastic members are provided, the second elastic members are helical, cylinder-shaped second springs, the second springs are respectively arranged in any of two adjacent vertical positions, one end of each second spring is connected to the base and an opposite end of each second spring is connected to the housing.

13. The electronic device as claimed in claim 12, wherein two more second springs are disposed respectively opposite to said two second springs.

14. The electronic device as claimed in claim 8, wherein the housing and the main body are magnetic.

15. The electronic device as claimed in claim 8, wherein the housing comprises a locking mechanism for mounting the input device onto the main body.

16. An auxiliary input mechanism for an electronic device, the auxiliary input mechanism comprising:
- a housing having a first housing end and a second housing end, the first housing end having a housing hole defined therethrough;
- a base received in the housing, the base including a base body and a pole portion extending from the base body, the pole portion extending out of the first housing end via the housing hole, and having a cross-section smaller than the housing hole so as to allow the pole portion to pivot in the housing, the base body having at least one protrusion formed on a base surface which faces the second housing end;
- at least one first spring member each having opposite first and second ends, the first end being fixed to the base body, the second end being fixed to the housing.

17. The auxiliary input mechanism as claimed in claim 16, further comprising a shaft, wherein the base has a through hole defined through the pole portion and the base body, the shaft is slidably received in the through hole, and a second spring member biasing the shaft in a direction parallel to the through hole.

18. The auxiliary input mechanism as claimed in claim 17, wherein the second spring member is a helical spring surrounding the shaft.

* * * * *